Oct. 22, 1929.  E. J. WILSON  1,732,626
STEERING MECHANISM FOR TRACTORS
Filed Sept. 5, 1925   6 Sheets-Sheet 3
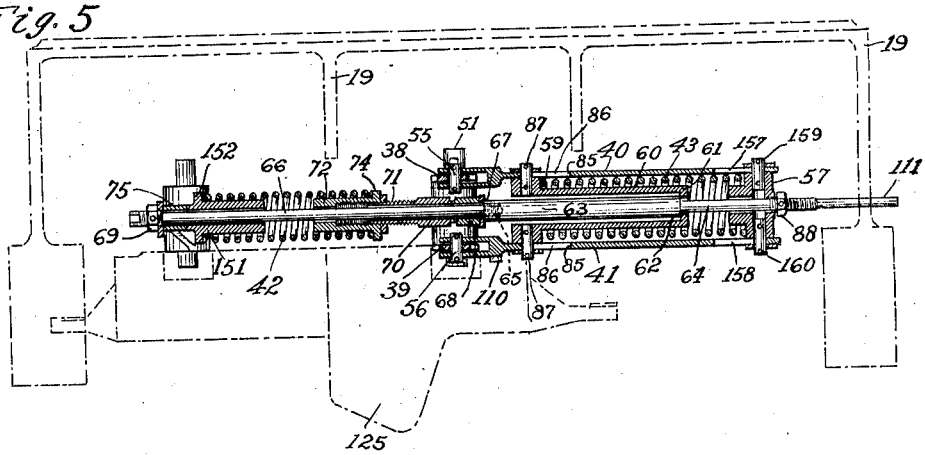
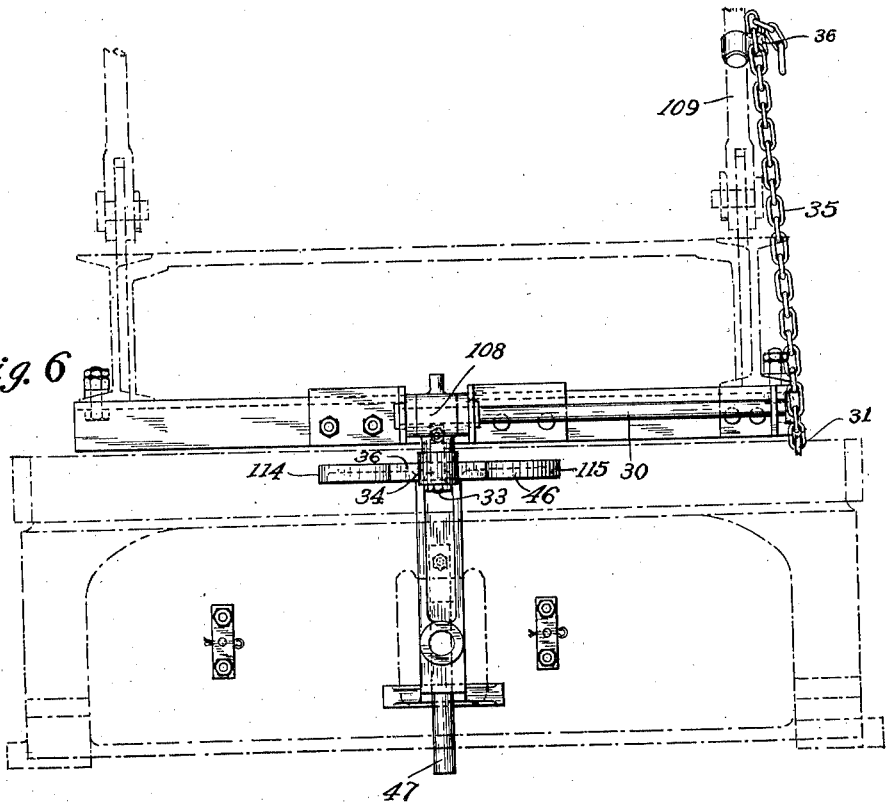
INVENTOR
Emery J. Wilson.
BY Richey Slough & Watts,
His ATTORNEYS.

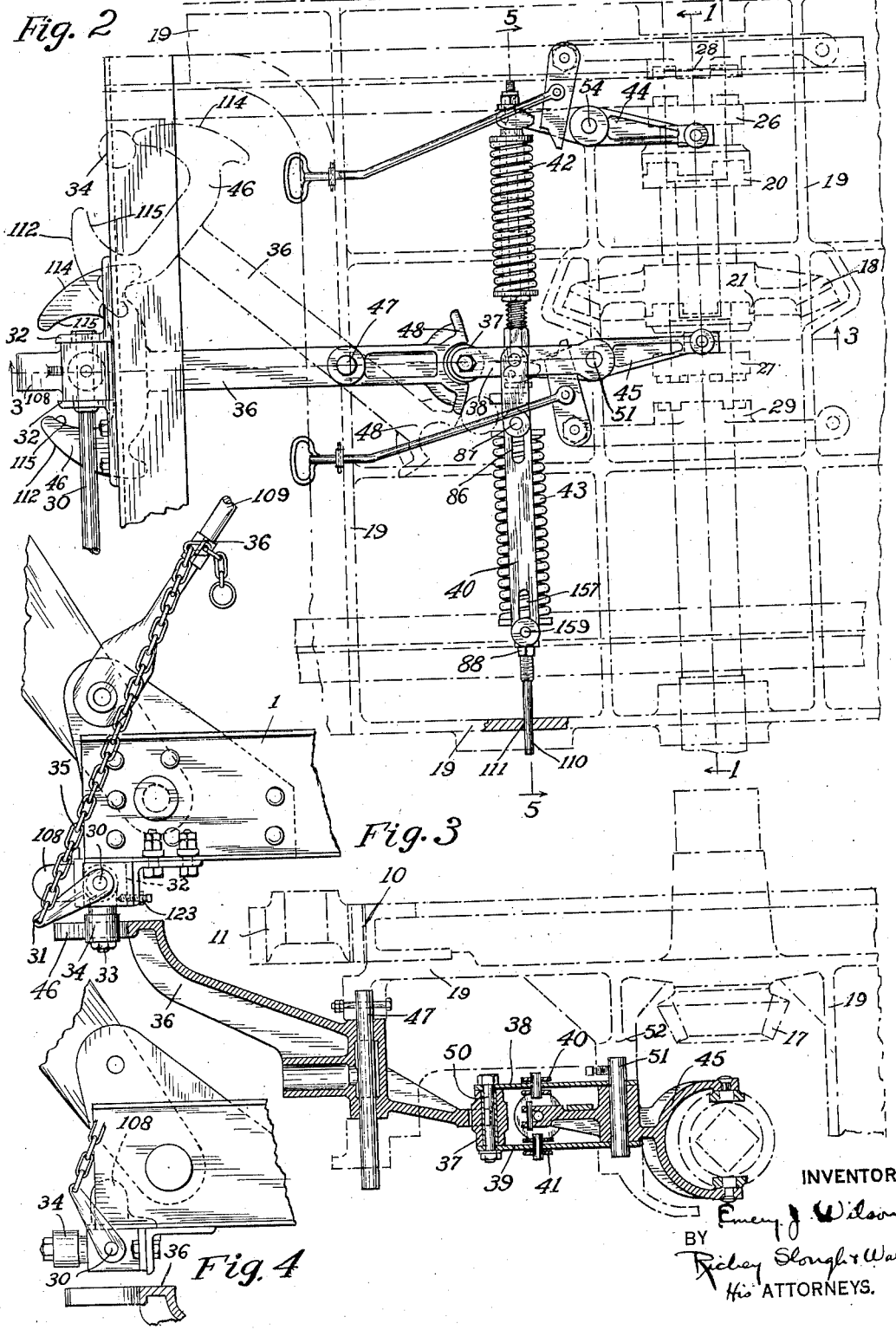

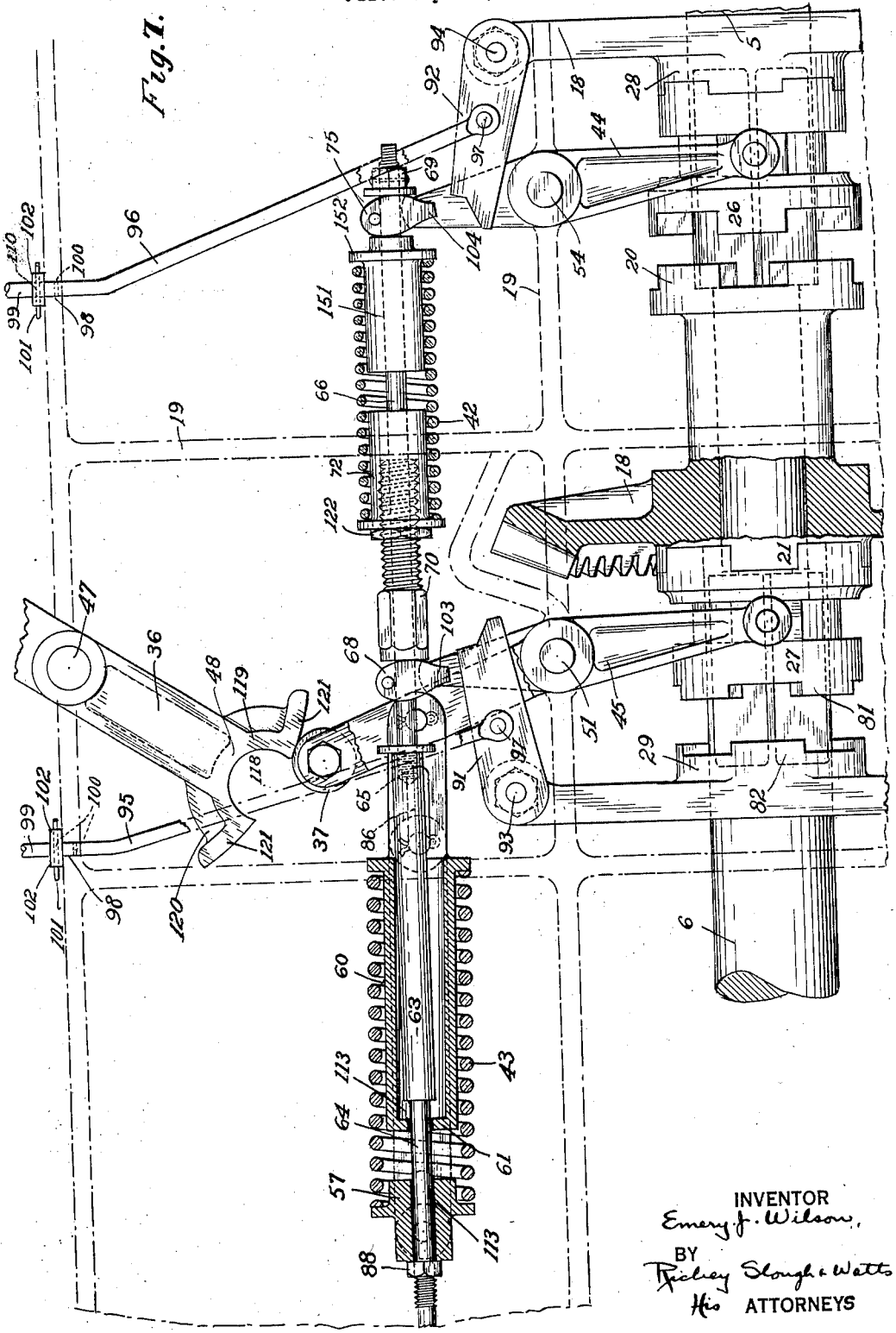

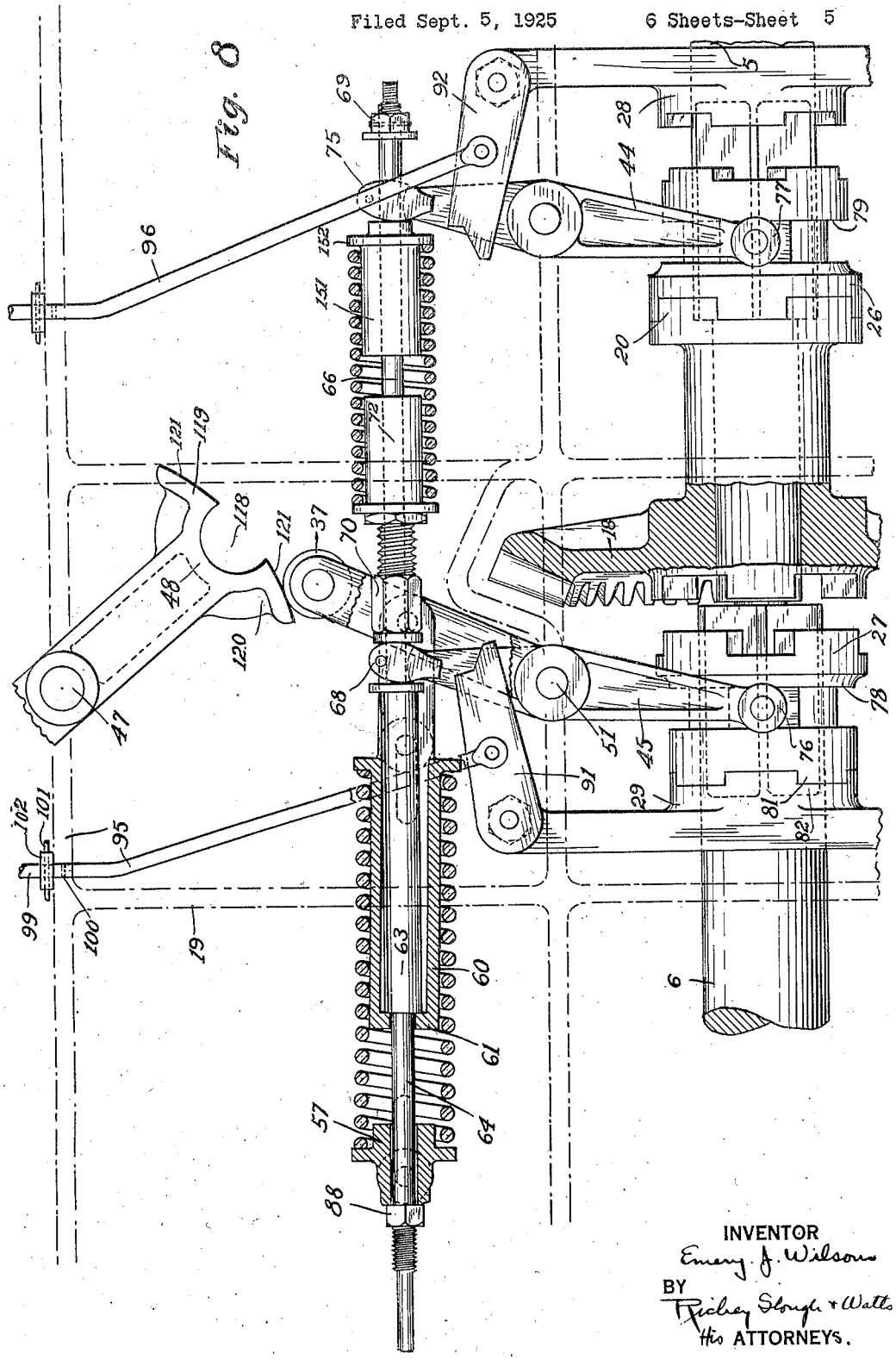

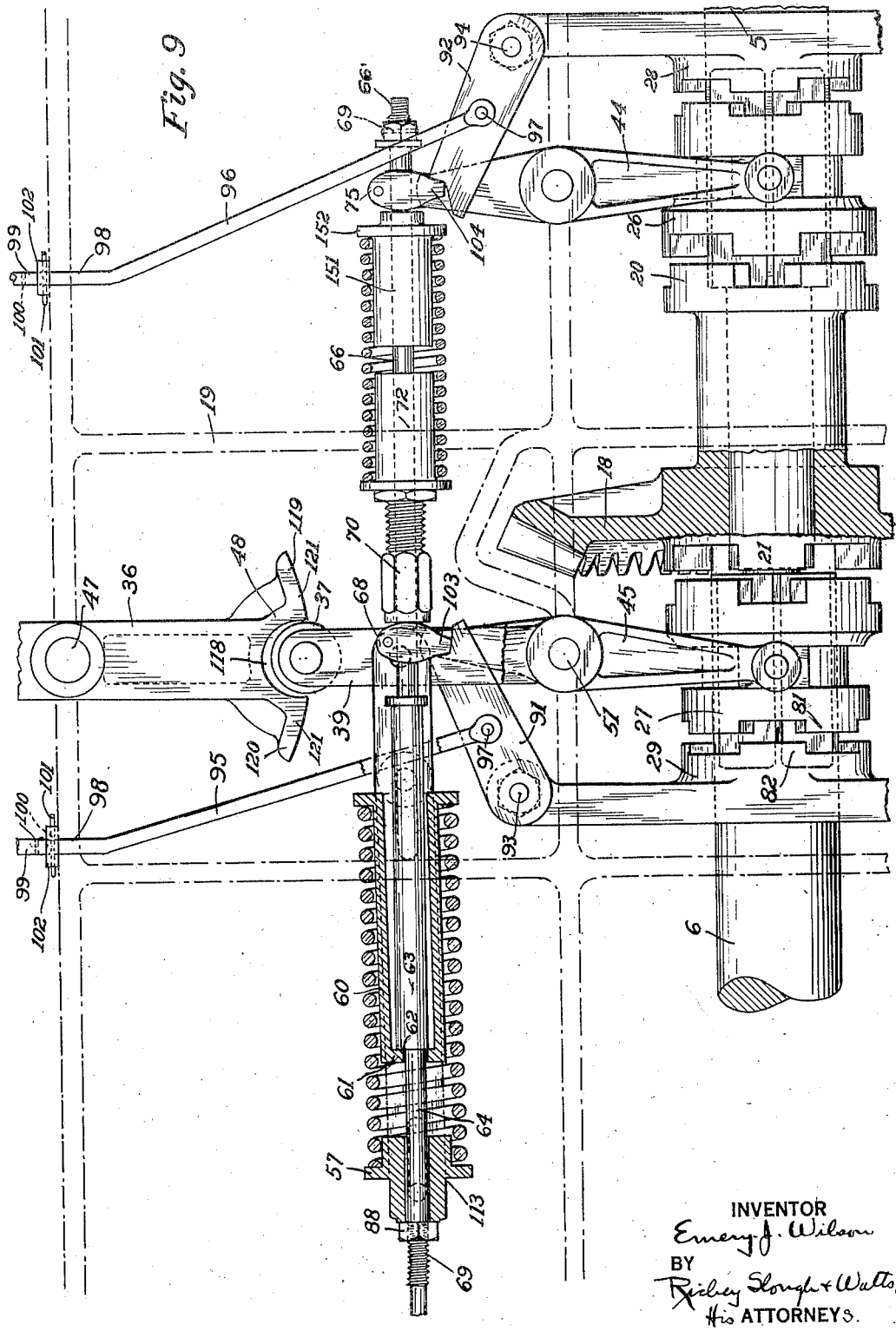

Patented Oct. 22, 1929

1,732,626

UNITED STATES PATENT OFFICE

EMERY J. WILSON, OF CLEVELAND, OHIO, ASSIGNOR TO THE THEW SHOVEL COMPANY, OF LORAIN, OHIO, A CORPORATION OF OHIO

STEERING MECHANISM FOR TRACTORS

Application filed September 5, 1925. Serial No. 54,610.

My invention relates to steering mechanism for tractors, and more particularly to steering mechanisms for tractors of the endless tread or track laying type wherein the steering is effected by controlling the operating of a pair of clutches in the lateral driving connections for the tractor.

It is an object of my invention to effect the steering of a tractor in a highly efficient manner by more efficient utilizing the power of the rotating turntable carried on the vehicle to operate the driving clutches, than has heretofore been done, so far as I am aware.

Another object of my invention is to provide for the resilient application of power for selectively operating either or both of the driving clutches whereby the vehicle may be steered and/or propelled.

Another object of my invention is to provide for the absorption of any and all undue stresses that might otherwise be imparted to parts of the steering linkage through rotation of the turn-table.

Another object of my invention is to provide for controlling of the clutches whereby they may both be held in a neutral non-driving position whenever, for instance, the tractor is being towed.

Another object of my invention is to permit one of the clutches to be set under the control of the rotating turntable to either driving, neutral or locked position whereby there will be communicated a driving effort from the engine or other motor carried by the turntable to its associated track driving roller, to discontinue such driving effort, or to lock the said driving roller and the track operated thereby in a fixed position, respectively.

Another object of my invention is to effect the positioning of either of the two companion clutches in any one of the aforesaid operative positions, or in neutral position, and the other clutch in any of said operative positions or neutral position.

Another object of my invention is to provide a mechanism of the class described which shall be relatively inexpensive to manufacture, but which, at the same time, will effect the functions sought to be performed by the mechanism in a highly efficient manner, and which will not be readily deranged or broken in use.

Another object of my invention is to provide as a unitary piece of apparatus a spring-set, by virtue of which the clutches may be efficiently controlled and restored, and which will provide an elastic shock absorbing link in the line of communicated motion from the turntable to the clutches.

Other objects of my invention and the invention itself will be more clearly understood by reference to the accompanaying drawings illustrating an embodiment of my invention and in which drawings—

Fig. 2 is a top plan view of controlling linkage comprising a bifurcated steering arm employed in the embodiment of Fig. 1, also with certain related parts largely indicated by dotted lines.

Fig. 3 is an elevational view of certain parts together with vertical sectional view of other parts taken on the line 3—3 of Fig. 2.

Fig. 4 shows mostly in elevation a portion of the apparatus of Fig. 3 in a different operative position.

Fig. 5 is a vertical section taken on the line 5—5 of Fig. 2, viewed from the end of the truck which carries the bifurcated steering arm.

Fig. 6 is an elevational view of a portion of the controlling mechanism, viewed from the steering arm end of the truck.

Figs. 7, 8 and 9 show partly in top plan and partly in horizontal sectional view, certain of the apparatus illustrated in Figs. 2 and 5.

Figure 1:
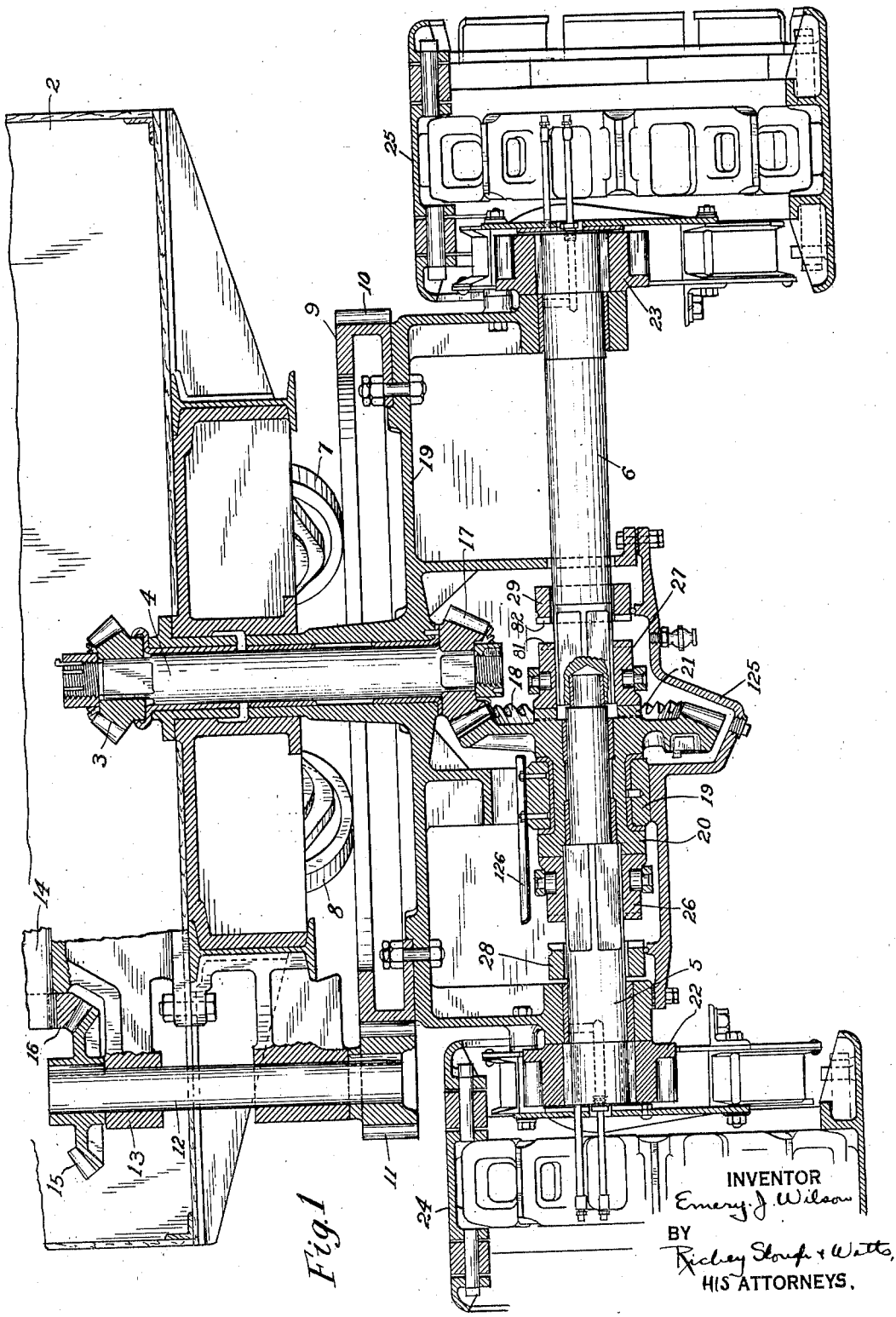
Fig. 1 shows a vertical transverse cross-section of an embodiment of my invention, comprising a track-laying tractor truck supporting a rotatable turntable, the line of section being in the plane of the aligned driving axles of the vehicle.

Referring now to all of the figures of drawing, and more particularly to Fig. 1 and to the various parts shown therein, which are indicated thereon by suitable reference characters, like characters in each figure designating like parts, at 1, I show a turntable supporting a superstructure 2 comprising a "house" which, in the embodiment of my invention illustrated herein, may contain the driving engine or motor, and driving connections co-operating therewith, whereby the bevel gear 3, keyed onto the center pin shaft 4, may be driven to communicate motion to the driving axles 5 and 6 to propel the vehicle.

The turntable 1 is journalled on the center pin 4 and is rotatable thereon, being supported by rollers such as 7, 8 and others, not shown, in the usual way for a vehicle of this kind, on a track 9. The track 9 has gear teeth 10 formed at its periphery adapted to cooperate with the teeth on the pinion 11; the pinion 11 is carried on a shaft 12 journalled in an arm 13 of the turntable frame and non-centrally thereof, whereby rotative motion may be imparted to the turntable by the driving connections from a driving shaft 14 to the shaft 12 through bevel gears 15 and 16.

The center pin 4, carries at its lower end, a bevel pinion 17 meshing with a beveled gear 18 journalled in the frame 19. The bevel gear 18 carries at its two ends jaw clutch elements 20 and 21. The jaw element 21 is disposed, preferably as shown, within the recess provided in the face of the bevel gear 18 and is arranged concentrically with the bevel gear teeth. The driving axles 5 and 6 have track driving rollers 22 and 23 secured to their respective ends for communicating the driving effort of the driving shafts to the vehicle supporting endless tracks illustrated at 24 and 25, and upon which the vehicle is propelled.

Sliding jaw clutch elements 26 and 27 are splined onto the driving shafts 5 and 6 respectively, and are adapted to key their respective shafts to the jaw clutch elements 20 and 21, respectively, whenever it is desired to communicate driving motion to the driving roller served by the one or the other of the respective driving shafts. Co-operating fixed jaw clutch elements 28 and 29 are provided for the sliding jaw clutch elements 26 and 27 and adapted to be engaged thereby when the sliding jaw clutches are advanced into operative engagement therewith, to lock the driving shaft whereon such sliding clutch is splined.

The effect of the provision of the elements above generally described is to provide a track-laying truck mechanism carrying a rotatable turntable upon which may be carried, the engine or motor mechanism, and comprising driving connections adapted to rotate the turntable relative to the chassis frame of the vehicle, and adapted to propel the vehicle by operating one or both of the driving rollers associated with the endless tracks thereof, and to permit turning of the vehicle by operation of only one of the driving rollers, and the turning movement may be accentuated by locking the non-driving roller and its track from movement.

Generally speaking, in the embodiment illustrated, the operation of the clutches is accomplished by communicating the power of the rotating turntable through suitable linkage to the sliding clutches, such linkage being hereinafter more specifically described, reference being had more particularly to figures of drawing other than Fig. 1.

Referring now more particularly to Figs. 2 to 4 inclusive, and Figs. 6, it will be seen that the superstructive turntable frame 1 carries a rotatable shaft 30, the said shaft having an operating lever arm 31 secured at one end thereof; the shaft is journalled in extensions 32 of the frame 1, and at its other end the shaft 30 hereinafter called the steering pin lever shaft, carries a steering latch pin 33 upon which there is journalled a steering latch roller 34, the pin 33 being rigidly and relatively non-rotatively secured to the rod 30.

To the end of the lever 30 a chain 35 is affixed, the chain 35 preferably normally extending upwardly and adapted to be secured to latch 36 as illustrated in Fig. 3. The effect of lifting the chain 35 is to rotate, the shaft 30 clockwise as seen in Figs. 3 and 4, to lift the steering latch roller 34 to its horizontal position as shown in Fig. 4, or when the chain is released the roller 34 will drop to the position shown in Fig. 3.

Suitable linkage comprising a steering arm 36 and complementary steering arm roller 37, link connections 38 and 39, forked side bar members 40 and 41, a steering compression spring 42, a safety compression spring 43, and jaw clutch shifting levers 44 and 45 are provided for the purpose of communicating movement of the turntable 1 to the clutches whenever the steering latch roller 34 is first placed in the complementary position shown in Fig. 3 wherein it is embraced by the bifurcated end 46, of the steering arm 36.

The steering arm 36 is journalled on a pin 47 secured to the chassis frame 19 and is likewise bifurcated at 48 to admit the steering arm roller 37 between the forks thereof as illustrated in Figs. 2, 3 and 9. Link connection means comprising levers 38 and 39 carry a pin 50 upon which the steering arm roller 37 is journalled; the levers 38 and 39 are adapted to swing about a pin 51 rigidly secured to an extension 52 of the truck chassis frame 19. The pin 51 acts as a fulcrum for the jaw clutch shifting lever 44. The levers 45 and 44 are adapted to be rotated on their respective pins 51 and 54 under the control of the mechanism comprising the steering compression spring and the safety compression spring as will be now described.

After the steering latch roller 34 is first placed between the forks of the steering arm 36, motion effective to move slidable jaw clutch elements 26 and 27 may be selectively communicated from the link connection levers 38 and 39 to the jaw clutch shifting levers 44 and 45 as follows:—

For turning the vehicle sharply to the left, while the vehicle is moved forwardly, that is, in the direction in which the lever extends the turntable will be rotated slightly in a counter clockwise direction so as to swing the connection link levers 38 and 39 laterally about the pin 51, in such a direction that the levers 38 and 39 as seen in Fig. 5 are moved to the left, as seen in Fig. 8. The forked side bar elements 40 and 41 will be moved thereby to the right, this being effected by virtue of the pins 55 and 56 which hinge the link levers 38 and 39 to the side bar members 40 and 41, respectively; side bar members 40 and 41 being moved to the left as seen in Fig. 5 will move the crosshead element 57 to the left compressing the safety compression spring 43 whereby pressure from the end 59 of the spring will be exerted against the peripheral flange of the cup-shaped safety spring center element 60. This will resiliently apply pressure from the end wall 61 of the element 60 against the shoulder 62 of the connecting rod 63.

The connecting rod 63 has a reduced end 64 and is screw-threaded at its other end as shown at 65 to a connecting rod 66, which carries at its remote threaded end, an adjusting nut 69. The end 67 of the connecting rod 63 will communicate pressure exerted toward the left as illustrated against the clutch shifting lever at its jaw end 68 and will rotate this jaw clutch shifting lever 45 in a clockwise direction, as viewed in Fig. 8, about its fulcrum pin 51. At the same time, the pressure of the connecting rod 63 will be transmitted by the clutch shifting lever jaw 68 to the threaded adjusting nut 70, which is screw-threaded at 71 into a hollow flanged center piece 72 loosely fitted onto the connecting rod 66, and the pressure transmitted by its flanged head 74 through the steering compression spring 42 by the flanged center piece 72 will be effective to move the jaw 75 of the other jaw clutch shifting lever 44 to rotate it in clockwise direction as viewed in Fig. 8.

The relative position of the parts after being operated as described, and after the jaw clutches have been thereby caused to be shifted, is illustrated in Fig. 8, wherein the jaw clutch shifting levers 45 and 44 are both shown as being rotated to their ultimate extreme position in the direction of clockwise rotation, and the clutch engaging arms thereof 76 and 77, respectively, which are fitted into grooves 78 and 79, respectively, of the sliding jaw clutches 27 and 26, respectively.

In this position, upon motion being transmitted through the center pin driving shaft 4, Fig. 1, to rotate the bevel gear 18, the drive shaft 5 will be rotated to rotate the roller 22, but the driving shaft 6 will be held stationary since the jaw clutch element 27 splined onto the shaft 6, by virtue of the interlocking of jaws 81 and 82 of the sliding clutch element 27 and of the fixed clutch element 29 respectively, is locked against rotation. Under such conditions the track 24 will be driven and the track 25 held immovable and the vehicle will swerve from the direction of travel toward the left. This operation is initiated by a counter-clockwise swinging of the turntable under steering conditions, which causes the shifting of the connection link levers 38 and 39 described.

In other words, if, as is commonly the case, a forwardly extending boom is carried by the turntable of the vehicle, a swinging of the turntable to shift the boom toward the left will steer the vehicle to the left, and as will be now seen, the contrary is likewise true, that the vehicle will steer to the right upon the proper connections being made and the boom being swung to the right.

For turning the vehicle sharply to the right a movement of the turntable in a clockwise direction will be had to effect rotation of the link connection levers 38 and 39 in such a direction that as viewed in Fig. 5, the pins 55 and 56 carried by these levers will be moved toward the right; in such case pressure will be exerted by the nearest edges 85 of the slots 86 in the side bar members 40 and 41, and will be transmitted by the pins 87 to the flanged cup-shaped center element 61 and will exert a pressure against the end 59 of the spring 43, and all pressure will be resiliently transmitted by the compressed spring against the crosshead element 59, longitudinal movement of the members 40 and 41 relative to the element 59 being possible by providing slots 157 and 158 in the members 40 and 41 respectively and by the passing of the pins 159 and 160 extending from the members 40 and 41 through the slots. Pressure conveyed by the spring to the element 59 will be exerted upon the reduced end 64 of the rod 63, to press it towards the right, the inner face of the adjusting nut 88 screw-threaded on the reduced end of the rod 64, transmitting such motion. This will draw the rod 63 toward the right as shown in Fig. 5, and will transmit a movement toward the right to the jaw 75 of the jaw clutch shifting lever 44 by virtue of the adjusting nut 69 on the rod 66. The motion will be transmitted through the jaw 75 of the clutch shifting lever against the left end face of the center piece 151, whose flanged head 152 will exert pressure toward the right to press the spring 42 to resiliently apply through the spring 42 a lever shifting effort transmitted through the flange 74 of the centerpiece 72 and the screw-threaded adjusting nut 70 affixed to the centerpiece 72 and bearing against the jaw 68 of the other jaw clutch shifting lever 45.

Therefore, in the latter described case, both jaw clutch shifting levers 44 and 45 will be shifted in such a direction at their jaw ends that as viewed in Fig. 7 they will be rotated counter-clockwise to the position shown in Fig. 7 wherein the sliding jaw clutches are disposed as shown, the jaw clutch 27 being moved into engagement with the jaw clutch element 21 of the double jaw clutch bevel gear 18 to rotate the driving shaft 6 by movement transmitted from such bevel gear through the jaw clutch elements 21—27; at the same time the sliding jaw clutch 26 will have been moved to the position shown in Fig. 7 wherein it will be clutched rigidly in engagement with the fixed jaw clutch 28, thus locking the driving shaft 5 against rotation and preventing rotation of its associated tread 24.

Thus the vehicle upon a movement of the turntable in a direction to swing the boom to the right, and a forward driving effort being given to the track driving mechanism, a forward steering of the tractor toward the right will be effected in such case as above described, the propelling track on the right side of the vehicle will be held locked against rotation and the propelling track to the left of the vehicle will exert a driving effort, the result of these two conditions being that the vehicle will be slued towards the right.

Whenever it is desired to propel the vehicle forwardly, but without causing it to swerve either to the right or to the left, it is only necessary to restore the turntable to its normal neutral position wherein the boom if one is carried by the turntable, will be disposed in neutral forward position whereupon the clutch shifting levers 44 and 45 will be restored to the position shown in Figs. 1 and 2, whereupon driving connection will be had to both of the tracks, and there will be no swerving from a straight ahead direction.

It will be understood that in the foregoing description it has been assumed that the center pin shaft 4 will be driven by the engine in such a direction as to propel the vehicle forwardly, that is with the boom extended forwardly, that is with the boom extended forwardly; that is with the boom extended in the direction of travel, and the steering latch in steering position, and it will be obvious that rearward direction of movement may be reversely had to the right or to the left or straight rearward movement if the direction of rotation of the center pin driving shaft 4 is reversed. This may be accomplished in the usual way by reversing the engine carried by the turntable or by the employment of reverse gear or reversing clutch connections such are are very commonly employed in this art.

Jaw clutch neutral latches 91 and 92 pivoted on latch pins 93 and 94 which are carried in the frame 81 are provided for the purpose of retaining the clutch shifting levers 45 and 44 respectively in their neutral positions as illustrated in Fig. 9. Jaw clutch neutral latch shifting rods 95 and 96 are provided for the latches 91 and 92, respectively, being rotatably secured thereto by pins 97. The rods 95 and 96 pass through perforations 98 in the wall of the frame 19 and have outwardly extending handle portions 99, projecting outwardly from the frame to a position where they may be readily grasped by the operator of the machine. A number of perforations 100 through the rods 95 and 96 and suitably spaced along such rods are provided for adjustment purposes, a pin 101 for each rod being provided whereby a collar 102 may be pinned to each of the rods through a desired one of the said perforations. As shown two of these perforations are herein provided, for each rod the outer perforations being used to position the rods 95 and 96 as illustrated in Figs. 7 and 8 wherein the latches 91 and 92 are withdrawn from holding contact with the jaws 103 and 104 which are integrally secured to the jaw clutch shifting levers 45 and 44, respectively.

It will be noted by referring to Figs. 7 and 8 that in such a case the collars 102 are held against the pierced frame by pins 100 passing through the more remote pair of openings 100, whereas in Fig. 9 this is accomplished by the pins passing through the less remote pair of openings 100.

In order to swing the clutch elements 27 and 26 to the neutral positions illustrated in Fig. 9, wherein the driving axles 6 and 5 are disconnected from driving connection with the double jaw clutch bevel gear 18, the turntable is rotated to the right as illustrated in Fig. 7, and the latch 92 is drawn to latching position as illustrated in Fig. 9 by pulling on the rod 96 and removing the collar 100 pinned to the outermost perforation in the rod 6 and replacing it on the rod 96 in a position where it will be pinned to the less remote opening 100. The turntable is then rotated to the left until the jaw clutch shifting lever 45 takes the position shown in Fig. 8 and the rod 95 is pulled by its handle 99 to a position wherein its pin 101 may be employed to pass through the collar 102, and the innermost perforation 100 as illustrated in Fig. 9; the turntable is then subsequently returned to neutral position. In such case the latches 91 and 92 will engage the spring pressed jaws 103 and 104 of the levers 45 and 44, respectively, and prevent them from returning to their fully restored position as illustrated in Fig. 2, which they would otherwise do were it not for the position of the latches 91 and 92. The clutches 27 and 26 will thereupon be held in the neutral positions shown in Fig. 9 whereupon the tractor mechanism may be towed without any driving or locking position being had between the driving axles 6 and 5 with the driving or locking clutches provided therefor.

It is believed that from the foregoing description a complete understanding will be had of the operation of the preferred embodiment of my invention illustrated in the drawings.

In the above description of the operation of the illustrated embodiment of my invention, reference was had to the various coacting parts, some of which will now be described more in detail. The steering latch carrying the roller 34 has an integrally formed weight portion 108 disposed at right angles to the steering latch roller 34 and is adapted to keep the roller in its latching position, as illustrated in Fig. 3, whenever the chain 34 is sufficiently lowered to permit the lever 31, journaled on the latch carrying shaft 30, to turn, due to the weight of the portion 108, integral with the latch having the roller 34. A hook 36 is tightly secured on to a rod 109 of the A-frame of the vehicle carried on the forward or boom carried portion of the rotating frame thereof. Equivalent means for holding the chain 35 may be secured to any fixed portion of the vehicle.

The connecting rod, extending substantially axially within the axially aligned safety compression spring 43 and the steering compression spring 42, is suitably supported at its reduced end 69 by the frame 19, being passed through an aperture 111 in the said frame. The compression springs 42 and 43 are preferably of different strengths, the steering compression spring 42 being the lighter of the two springs, the safety compression spring 43 being preferably capable of sustaining at least twice the weight or pressure as that of the steering compression spring 42 within its elastic limit. For this reason, the steering compression spring is made of lighter gauge spring steel than is the other spring, since in practice, it is not called upon to withstand the pressure imparting shocks to the same degree as is the larger spring.

The reduced portion 64 of the connecting rod 63 which passes through the cross head element 57, is adapted to have a considerable clearance within the longitudinal bore 113 of the cross head, and is capable of swinging laterally within the bore of the flanged center element 60, to a limited extent, as illustrated in Figs. 7 and 8.

At 110, Fig. 5, I show a rest pad for the spring mechanism, comprising the springs 42 and 43, to help to support the weight of the intermediate portions of the mechanism, the pad 110 being preferably fixed to the lowermost side bar element 41 and adapted to slide upon an adjacent portion of the frame 19, not shown.

The steering arm 36 has its bifurcated end so shaped as to have converging arcuate edges 112 and 114, and similar inclined inner edges 115 for each fork thereof, all of which pairs of edges converge toward their outer ends. A function intended to be performed by the element 36 and which is efficiently effected by the illustrated preferred shaping of the forks thereof, is to permit the latch roller 34, when the turntable is rotated and the roller depressed, as seen in Fig. 3, to engage, if the roller is not dropped within the forks, one of the sides 112 or 114. As the turntable continues its rotation the roller 34 will ride along such sides to the tips of the forks, and then after being lifted on its pivot rod 30, will drop into the space between the forks, after which the bifurcated steering lever 36 will carry between its forks the roller 34 and be controlled in its rotative movement about its pivot pin 47 by the roller 34 as moved by the rotation of the carrying turntable. When the turntable is rotated beyond that position which is indicated by dotted lines in Figs. 1 and 2 which position is effective to displace the roller 37 to the position, as illustrated in Figs. 7 and 8, wherein the clutches are shifted to their ultimate extreme positions, right and left, further rotation of the turntable will result in the latching roller 34 riding over the tip of the second fork and passing outside of the space intermediate the forks.

Re-engagement of the steering lever 36 by the controlling roller 34 may be had by again rotating the turntable from either direction to that position wherein the roller 34 may again enter the space between the forks, in the manner above described. It will be seen, by referring to the position of the lever 36, illustrated in Fig. 8 and that illustrated in Fig. 7, that in these figures the lever or steering arm 36, may take the positions of Figs. 7 and 8 wherein the roller 37, herein called the steering arm roller, may have the space 118 between the forks 119 and 120 at the inner end of the steering arm and rides upon the arcuate outer face 121 of the fork 119, Fig. 7 or of the fork 129, Fig. 8. The faces 121 are preferably segments of the same circle and concentric with the axis of the pin 47 upon which the arm 36 is swung, and the retractive pressure exerted upon the fork 119, Fig. 7, or in the other position of Fig. 8, upon the curved surface 121 of the fork 120, is exerted in a direction which will produce no operative movement of the steering arm 36, the steering arm relative to such pressure being then in what may be called a "dead center" or "locking" position. When the steering arm 36 is moved toward the central position shown in Fig. 9, the retractive pressure tending to restore the link connection members 38 and 39, which support the roller 37 and which pressure is exerted by the compression springs 42 and 43, will cause the roller 37 to be resiliently snapped into the recess 118 between the forks of the steering lever arm 36, and the movement of the link connection members carrying the roller 37 will be subject to the movements communicated to the arm 36 by movements of the turntable communicated to such arm through the steering arm element 36 through roller 34. It will be seen that these compression springs tend to restore the operating levers comprising the link connection elements 38 and 39 and the jaw clutch shifting levers 44 and 45 to normal position.

Although I have not shown in detail all of the driving connections between the treads 24 and 25 and the engine or motor which would be provided to drive such treads and the gear connections within the treads, whereby motion will be communicated between the driving motors 22 and 23 to such treads, these may be of any well-known form or type suitable to perform the functions intended and related herein, and they may be of the type disclosed in my former application, Serial No. 756,465, filed December 17, 1924, and the co-pending applications referred to therein. The present invention is related to the steering control mechanism described and illustrated herein and as claimed in the accompanying claims.

It will be observed that by virtue of the arrangement of the parts described, the turntable may be moved to successive positions from a central position as illustrated in Fig. 9, as follows:—

First, a position where the driving clutch is just starting to release; second, where the driving clutch is released; third, where the holding clutch is released; and, fourth, to a locking position wherein the clutch operating levers are by virtue of the relative positions of the steering arm 36 and the roller 37 locked in their operative positions, as illustrated in Figs. 7 and 8; and that there is a like series of turntable positions for each direction of turntable rotation from a normal or central turntable position.

Although I do not wish to be limited to a given amplitude of turntable swing to accomplish the different steering functions described, in a machine built according to the drawings and foregoing description, I secured very efficient results by so arranging the parts, as illustrated, that the driving clutch would start to release upon approximately a rotation of 3¾° by the turntable, and that upon a further rotation of about 3°, the driving clutch releases, and upon a further rotation of 3°, the holding clutch releases, after which upon rotating the turntable to about 6¾° in advance of the position where the holding clutch was released it attains the locking position of the levers, as described and shown in Figs. 7 and 8. Of course, it will be understood that these values would be modified if, for instance, the steering lever arm 36 had its fulcrum point positioned differently along its length, and that other modifications might be made which would enable the functions to be performed upon swings of different amplitude by the turntable. It will be observed also that I have provided adjusting means for the compression spring, steering clutch, controlling mechanism comprising co-operating threaded portions of the rod 69 and the rod 66 at the end portions of such rods and nuts 88 and 64, respectively, and also by the provision of the adjusting nut 70, which is threaded into the center element 72. A clamping nut 122 is provided to rigidly maintain a given adjusted position of the nut 70 relative to the center element 72. At 123, Fig. 3, I show an adjustable screw adapted to be locked by a clamping nut, against which the steering latch 33 may contact to limit its movement to a vertical position under the influence of the weight 108. It will be observed also that I have provided for the jaw clutches and the large bevel gear 18 and driving pinion 17, as well as the other jaw clutch elements 20, 21, 26, 27, 28 and 29, a casing, comprising integral portions of the lower frame 19 and lower pan element 125, which is oil-proof, for containing lubricant for lubricating the contained moving parts.

I have also provided an oil basin 126 adapted to deflect oil or other lubricant carried by the large gear 18 and dropping on one side of the pan over into the other compartment on the opposite side of the casing, wherein is contained the jaw clutch elements 20, 26 and 28. I find that this arrangement is very efficient for the purpose intended and insures always that a sufficient supply of lubricant will be available and effective to properly lubricate the moving parts mentioned.

While I have described my invention in a specific embodiment, I am aware that numerous and extensive departures may be made from the embodiment herein illustrated and described but without departing from the spirit of my invention and from the scope of the accompanying claims.

I claim as my invention:

1. In a tractor mechanism, the combination with a chassis therefor, of a crawling track at each side of the chassis and supporting the same, a rotatable turntable supported by the chassis carrying a prime mover, driving connections from the prime mover to the crawling tracks, a pair of clutches one in each driving connection, levers for operating the clutches, a spring connecting the levers and tending normally to move them to close their respective clutches, linkage to communicate motion from the turntable when rotated in one direction to move one of the clutches to open the same, and when rotated in the opposite direction to open the other clutch, and a detent for each clutch adapted to be moved into a position to retain its associated clutch in opened position against the tendency of the spring to return it to closed position.

2. In a tractor mechanism, the combination with a chassis therefor, of a crawling track at each side of the chassis and supporting the same, a rotatable turntable supported by the chassis carrying a prime mover, driving connections from the prime mover to the crawling tracks, a pair of clutches one in each driving connection, levers for operating the clutches, a spring connecting the levers and tending normally to move them to close their respective clutches, linkage to communicate motion from the turntable when rotated in one direction to move one of the clutches to open the same, and when rotated in the opposite direction to open the other clutch, and a detent for each clutch adapted to be moved into a position to retain its associated clutch in open position against the tendency of the spring to return it to closed position, said linkage comprising a part carried by the turntable, adapted to communicate motion to the clutches for only a relatively small arc of movement of the turntable.

3. In a tractor mechanism, the combination with a chassis therefor, of a crawling track at each side of the chassis and supporting the same, a rotatable turntable supported by the chassis carrying a prime mover, driving connections from the prime mover to the crawling tracks, a pair of clutches one in each driving connection, levers for operating the clutches, a spring connecting the levers and tending normally to move them to close their respective clutches, linkage to communicate motion from the turntable when rotated in one direction to move one of the clutches to open the same, and when rotated in the opposite direction to open the other clutch, and a detent for each clutch adapted to be moved into a position to retain its associated clutch in opened position against the tendency of the spring to return it to closed position, said linkage comprising a part carried by the turntable, adapted to communicate motion to the clutches for only a relatively small arc of movement of the turntable and comprising yieldable spring means through which pressure is applied from the turntable to the clutch to be moved.

4. In a tractor mechanism, the combination with a chassis therefor, of a crawling track at each side of the chassis and supporting the same, a rotatable turntable supported by the chassis carrying a prime mover, driving connections from the prime mover to the crawling tracks, a pair of clutches one in each driving connection, levers for operating the clutches, a spring connecting the levers and tending normally to move them to close their respective clutches, linkage to communicate motion from the turntable when rotated in one direction to move one of the clutches to open the same, and when rotated in the opposite direction to open the other clutch, and a detent for each clutch adapted to be moved into a position to retain its associated clutch in opened position against the tendency of the spring to return it to closed position, said linkage comprising a part carried by the turntable, adapted to communicate motion to the clutches for only a relatively small arc of movement of the turntable and comprising yieldable spring means through which pressure is applied from the turntable to the clutch to be moved, said spring and said spring means comprising parts of a unitary apparatus interposed between the clutches and the rotatable turntable.

5. In a tractor mechanism, the combination with a chassis therefor, of a crawling track at each side of the chassis and supporting the same, a rotatable turntable supported by the chassis carrying a prime mover, driving connections from the prime mover to the crawling tracks, a pair of clutches one in each driving connection, levers for operating the clutches, a spring connecting the levers and tending normally to move them to close their respective clutches, linkage to communicate motion from the turntable when rotated in one direction to move one of the clutches to open the same, and when rotated in the opposite direction to open the other clutch, and a detent for each clutch adapted to be moved into a position to retain its associated clutch in opened position against the tendency of the spring to return it to closed position, said linkage comprising a part carried by the turntable, adapted to communicate motion to the clutches for only a relatively small arc of movement of the turntable, and an interposed lever for communicating motion from the turntable carried part to the clutches, said part and said interposed lever having complementary contacting portions comprising a bifurcated projection of the one portion adapted to embrace a projecting arm of the other portion, that complementary portion carried by the turntable carried part being adapted to be carried by the continued movement of the turntable out of operative engagement with the other complementary portion.

6. In a tractor mechanism, the combination with a chassis therefor, of a crawling track at each side of the chassis and supporting the same, a rotatable turntable supported by the chassis carrying a prime mover, driving connections from the prime mover to the crawling tracks, a pair of clutches one in each driving connection, levers for operating the clutches, a spring connecting the levers and tending normally to move them to close their respective clutches, linkage to communicate motion from the turntable when rotated in one direction to move one of the clutches to open the same, and when rotated in the opposite direction to open the other clutch, and a detent for each clutch adapted to be moved into a position to retain its associated clutch in opened position against the tendency of the spring to return it to closed position, said linkage comprising a part carried by the turntable, adapted to communicate motion to the clutches for only a relatively small arc of movement of the turntable, and an interposed lever for communicating motion from the turntable carried part of the clutches, said part and said interposed lever having complementary contacting portions comprising a bifurcated projection of the one portion adapted to embrace a projecting arm of the other portion, that complementary portion carried by the turntable carried part adapted to be carried by the continued movement of the turntable out of possible contact with the other complementary portion, and locking means for the clutches adapted to retain a clutch in opened position, upon movements of the turntable beyond a rotative position thereof wherein operative engagement is rendered impossible between said contacting portions.

7. In a tractor mechanism, the combination with a chassis therefor, of a crawling track at each side of the chassis and supporting the same, a rotatable turntable supported by the chassis carrying a prime mover, driving connections from the prime mover to the crawling tracks, a pair of clutches one in each driving connection, levers for operating the clutches, a spring connecting the levers and tending normally to move them to close their respective clutches, linkage to communicate motion from the turntable when rotated in one direction to move one of the clutches to open the same, and when rotated in the opposite direction to open the other clutch, and a detent for each clutch adapted to be moved into a position to retain its associated clutch in opened position against the tendency of the spring to return it to closed position, said linkage comprising a part carried by the turntable, adapted to communicate motion to the clutches for only a relatively small arc of movement of the turntable, and an interposed lever for communicating motion from the turntable carried part of the clutches, said part and said interposed lever having complementary contacting portions comprising a bifurcated projection of the one portion adapted to embrace a projecting arm of the other portion, that complementary portion carried by the turntable carried part adapted to be carried by the continued movement of the turntable out of possible contact with the other complementary portion, and locking means for the clutches adapted to retain a clutch in opened position, upon movements of the turntable beyond a rotative position thereof wherein operative engagement is rendered impossible between said contacting portions, said locking means being adapted to be disabled upon re-contact of the said contacting portions when the turntable is returned.

8. In a tractor mechanism, the combination with a chassis therefor, of a crawling track at each side of the chassis and supporting the same, a rotatable turntable supported by the chassis carrying a prime mover, driving connections from the prime mover to the crawling tracks, a pair of clutches one in each driving connection, levers for operating the clutches, a spring connecting the levers and tending normally to move them to close their respective clutches, linkage to communicate motion from the turntable when rotated in one direction to move one of the clutches to open the same, and when rotated in the opposite direction to open the other clutch, and a detent for each clutch adapted to be moved into a position to retain its associated clutch in opened position against the tendency of the spring to return it to closed position, said linkage comprising a part carried by the turntable, adapted to communicate motion to the clutches for only a relatively small arc of movement of the turntable, and an interposed lever for communicating motion from the turntable carried part of the clutches, said part and said interposed lever having complementary contacting portions comprising a bifurcated projection of the one portion adapted to embrace a projecting arm of the other portion, that complementary portion carried by the turntable carried part adapted to be carried by the continued movement of the turntable out of possible contact with the other complementary portion, and locking means for the clutches adapted to retain a clutch in opened position, upon movements of the opened position, upon movements of the turntable beyond a rotative position thereof wherein operative engagement is rendered impossible between said contacting portions, said locking means adapted to be disabled upon a re-engagement of the said contacting portions when the turntable is returned, said locking means comprising an actuating lever interposed between the said interposed lever and the clutch levers, said actuating lever being movable to either of two extreme positions and to an intermediate position, and having a free end, said interposed lever engaging said end of the actuating lever when moved to operate the clutch levers, said actuating lever engaging an end face of one of the forks of said interposed lever when said lever is moved to an extreme position and locked thereby.

9. In a crawling tractor mechanism comprising a pair of crawling tracks disposed at the sides of the mechanism, a driving connection adapted to communicate driving motion to each track, a clutch in said driving connection, a clutch lever for each said clutch, a spring interposed between the clutch levers and adapted to exert clutch closing pressure thereon, a rotatable turntable carried by the tractor mechanism, means to communicate pressure derived from motion of the rotatable turntable against an end of said spring to cause one of said clutches to open its respective clutch and to exert clutch closing pressure against the other lever, detent means for each clutch to maintain it in open position after being moved thereto.

10. In a crawling tractor mechanism comprising a pair of crawling tracks disposed at the sides of the mechanism, a driving connection adapted to communicate driving motion to each track, a clutch in said driving connection, a clutch lever for each said clutch, a spring interposed between the clutch levers and adapted to exert clutch closing pressure thereon, a rotatable turntable carried by the tractor mechanism, means to communicate pressure derived from motion of the rotatable turntable against an end of said spring to cause one of said clutches to open its respective clutch and to exert clutch closing pressure against the other lever, said pressure communicating means including a spring, detent means for each clutch to maintain it in open position after being moved thereto.

11. In a crawling tractor mechanism comprising a pair of crawling tracks disposed at the sides of the mechanism, a driving connection adapted to communicate driving motion to each track, a clutch in said driving connection, a clutch lever for each said clutch, a spring interposed between the clutch levers and adapted to exert clutch closing pressure thereon, a rotatable turntable carried by the tractor mechanism, means to communicate pressure derived from motion of the rotatable turntable against an end of said spring to cause one of said levers to open its respective clutch and to exert clutch closing pressure against the other lever, said pressure communicating means comprising a spring.

In testimony whereof I hereunto affix my signature this 1st day of September, 1925.

EMERY J. WILSON.